J. BAHNSEN.
FRICTION HINGE.
APPLICATION FILED MAY 5, 1909.
1,026,781.
Patented May 21, 1912.
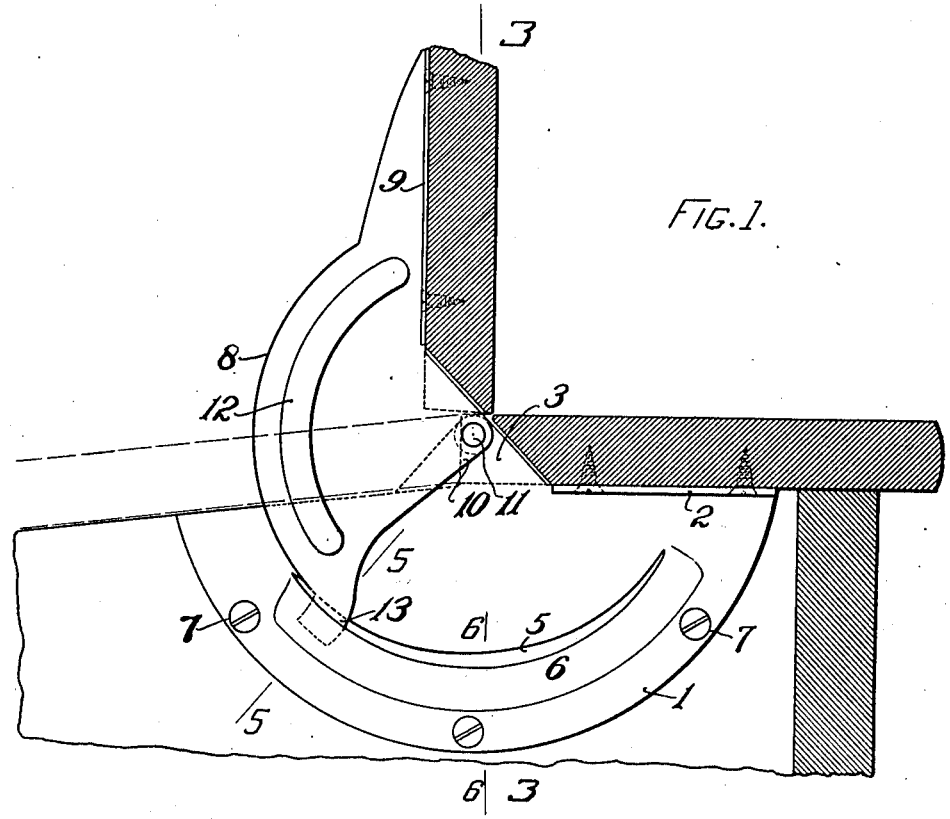
FIG. 1.
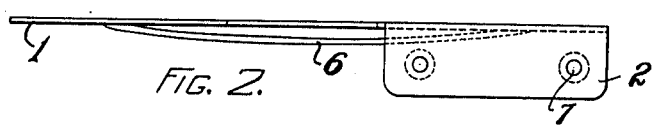
FIG. 2.
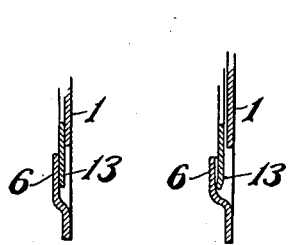
FIG. 5. FIG. 6.
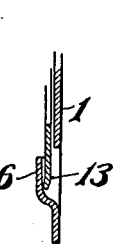
FIG. 3.
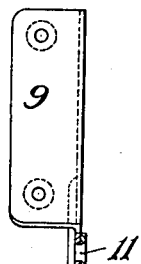
FIG. 4.
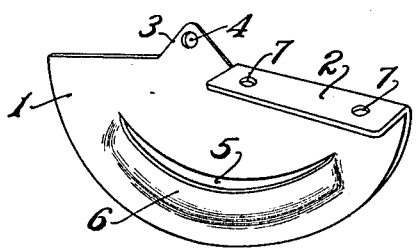
WITNESSES
A. T. Palmer
H. W. Kelso
INVENTOR
John Bahnsen
By Richard P. Elliott,
attorney.
COLUMBIA PLANOGRAPH CO., WASHINGTON, D. C.

UNITED STATES PATENT OFFICE.

JOHN BAHNSEN, OF CHICAGO, ILLINOIS, ASSIGNOR TO AMERICAN SEATING COMPANY, A CORPORATION OF NEW JERSEY.

FRICTION-HINGE.

1,026,781.

Specification of Letters Patent. Patented May 21, 1912.

Application filed May 5, 1909. Serial No. 494,474.

*To all whom it may concern:*

Be it known that I, JOHN BAHNSEN, a citizen of the United States, residing in Chicago, county of Cook, and State of Illinois, have invented certain new and useful Improvements in Friction-Hinges, of which the following is a specification, reference being had to the drawings accompanying the same and forming a part thereof.

My invention relates to friction hinges for furniture and the like.

The object of my invention is to produce a hinge that has few parts, is simple in construction, and which is provided with a friction device arranged to produce the minimum and maximum friction at the desired points of the rotative movement of the hinge parts.

In the drawings which accompany this specification and form a part thereof—Figure 1 is a section of a lid top desk with my hinge attached, and shows a side elevation of the hinge members; Fig. 2 is a plan view from the top edge of one of the hinge members and shows the form of friction device; Fig. 3 is an edge view through line 3—3, Fig. 1; Fig. 4 is a perspective of one member of the hinge; Fig. 5 is a section of the friction portion of the hinge taken on line 5—5 Fig. 1; and Fig. 6 is a section of the friction portion of the hinge taken on line 6—6 Fig. 1, with the hinge partly closed.

The member 1 is of the form of a segment of a circle, and is provided with the portion 2 at right angles to the body, the portion 2 serving the double purpose of providing additional means for securing the hinge to the article of furniture to which it is to be attached, and of strengthening the body portion of the hinge to prevent its bending flatwise. The member 1 is provided with the angular portion 3 having a hole 4 for the pivot member of the hinge. It is also provided with a semi-circular slot 5 which enables the part 6 to be stretched or formed outwardly, as shown in the perspective Fig. 4 and the edge view Fig. 3, to permit the friction member of the other hinge portion to pass through the slot and bear against the inside of the part 6, as will be more fully explained hereafter. This outwardly extending portion 6 may be bent outwardly at varying distances throughout its length to provide a maximum and minimum amount of friction at different points in the rotative movement of the hinge, as will be readily seen. In the drawings the greatest distance the portion 6 extends outwardly is at the center, or at the dotted line 6—6, at the center, or at the minimum amount of friction to provide the minimum amount of friction at the middle of the full rotative movement of the hinge members, and the greatest amount of friction at each end, the purpose of this being to provide the maximum friction at the ends so that the friction will be sufficient to sustain the desk-lid in its upward position, as shown in Fig. 5, and to hold it firmly in its downward position when the friction member is at the opposite end of the slot 5.

The member 1 is provided with holes 7, 7, 7, etc., to receive fastening devices, such as wood screws or the like. The member 8 of the friction hinge is preferably formed in the shape shown in Fig. 1 and has the flange portion 9, preferably bent at right angles to its body portion, for the purpose of securing it to the portion of the piece of furniture to which the hinges are to be attached. It is also provided with the angular portion 10 having a hole corresponding with the hole 4 to receive the pivot 11 which joins the two hinge members together. It is also preferably formed with the semi-circular rib 12 for the purpose of stiffening its unattached portion. The portion 13 is formed and arranged to pass through the slot 5 and bear against the inside of the portion 6. It is slightly curved, as shown in Figs. 3 and 6, so as to be under a slight initial tension when the hinge members are secured together, and to bear with greater tension at the ends of the portion 6 as it is moved to the limit of the movement of the hinge members.

The member 8 is provided with the screw-holes to receive means for fastening it to the article of furniture to which it is to be attached.

The simplicity of construction will be readily seen from the fact that the completed hinge is composed of but three members, the two hinge members and the pivot member, the friction between the two members being produced by the arrangement and form of the hinge members themselves.

What I claim is—

1. In a friction hinge, a rotative member and a stationary member; a pivot joining said members; a semi-circular slot in one of said members having its outer wall bent outwardly from the plane of said member to form a friction surface; a projection on the other of said members formed and arranged to extend through said slot and bear against said friction surface under tension.

2. In a friction hinge, a rotative member and a stationary member; a pivot joining said members; a semi-circular slot in one of said members having its outer wall bent to form a friction surface, said wall being bent outwardly the greatest distance midway said slot, the bend gradually lessening to the ends of said slot; a projection on the other of said members arranged to extend through said slot and bear against said friction surface under tension, the tension being greatest at the ends of said slot.

In testimony whereof, I have hereunto set my hand, in the presence of two subscribing witnesses, this the 13th day of April, A. D. 1909.

JOHN BAHNSEN.

Witnesses:
   LOUIS E. VACHERON,
   GEO. PURTEANT.

---

Copies of this patent may be obtained for five cents each, by addressing the "Commissioner of Patents, Washington, D. C."